(12) United States Patent
Jones et al.

(10) Patent No.: US 12,466,132 B2
(45) Date of Patent: Nov. 11, 2025

(54) REPLENISHMENT SYSTEM FOR THREE-DIMENSIONAL PRINTING SYSTEM

(71) Applicants: NISSAN NORTH AMERICA, INC., Franklin, TN (US); NORTHWESTERN UNIVERSITY, Evanston, IL (US)

(72) Inventors: Evan Jones, Evanston, IL (US); Cheng Sun, Wilmette, IL (US); Nanzhu Zhao, Novi, MI (US)

(73) Assignees: NISSAN NORTH AMERICA, INC., Franklin, TN (US); NORTHWESTERN UNIVERSITY, Evanston, IL (US)

( * ) Notice: Subject to any disclaimer, the term of this patent is extended or adjusted under 35 U.S.C. 154(b) by 104 days.

(21) Appl. No.: 18/521,873

(22) Filed: Nov. 28, 2023

(65) Prior Publication Data
US 2025/0170777 A1 May 29, 2025

(51) Int. Cl.
| | |
|---|---|
| *B29C 64/314* | (2017.01) |
| *B29C 64/124* | (2017.01) |
| *B29C 64/245* | (2017.01) |
| *B29C 64/255* | (2017.01) |
| *B29C 64/393* | (2017.01) |
| *B33Y 30/00* | (2015.01) |
| *B33Y 40/00* | (2020.01) |
| *B33Y 50/02* | (2015.01) |

(52) U.S. Cl.
CPC .......... *B29C 64/314* (2017.08); *B29C 64/124* (2017.08); *B29C 64/245* (2017.08); *B29C 64/255* (2017.08); *B29C 64/393* (2017.08); *B33Y 30/00* (2014.12); *B33Y 40/00* (2014.12); *B33Y 50/02* (2014.12)

(58) Field of Classification Search
CPC ..................................................... B29C 64/314
See application file for complete search history.

(56) References Cited

U.S. PATENT DOCUMENTS

| | | | | |
|---|---|---|---|---|
| 9,327,449 | B2 * | 5/2016 | Ding | B29C 64/336 |
| 9,555,584 | B2 * | 1/2017 | Costabeber | B29C 64/124 |
| 10,399,272 | B2 | 9/2019 | Linnell et al. | |
| 11,260,595 | B2 * | 3/2022 | Jau | B29C 64/386 |
| 11,458,672 | B2 * | 10/2022 | John | B29C 64/245 |
| 11,597,140 | B2 * | 3/2023 | Medalsy | B29C 64/129 |
| 2015/0072293 | A1 | 3/2015 | DeSimone et al. | |

(Continued)

FOREIGN PATENT DOCUMENTS

| | | |
|---|---|---|
| CN | 107263861 A | 10/2017 |
| CN | 107791512 A | 3/2018 |

(Continued)

*Primary Examiner* — Timothy Kennedy
(74) *Attorney, Agent, or Firm* — Global IP Counselors, LLP

(57) ABSTRACT

A 3D printing system includes a tank containing a liquid photopolymer resin. A textured substrate is connected to the tank. The textured substrate is configured such that light passes therethrough into the liquid polymer resin. A layer of an inert material is disposed on the textured surface. The liquid photopolymer resin and the inert material are discharged from the tank through a tank outlet. Additional liquid photopolymer resin and additional inert material are added to the tank through a tank inlet.

20 Claims, 4 Drawing Sheets

(56) References Cited

U.S. PATENT DOCUMENTS

| | | | |
|---|---|---|---|
| 2015/0165678 A1* | 6/2015 | Ding | B33Y 10/00 425/150 |
| 2016/0137839 A1* | 5/2016 | Rolland | C08G 18/4854 522/71 |
| 2017/0057162 A1* | 3/2017 | Spadaccini | G02B 1/007 |
| 2017/0129052 A1 | 5/2017 | Buller et al. | |
| 2018/0065302 A1 | 3/2018 | Arai et al. | |
| 2019/0111616 A1* | 4/2019 | Watanabe | B33Y 10/00 |
| 2019/0160733 A1* | 5/2019 | Mirkin | B29C 67/00 |
| 2020/0061904 A1 | 2/2020 | Kim et al. | |
| 2020/0102529 A1* | 4/2020 | Guillemot | B33Y 80/00 |
| 2020/0324466 A1* | 10/2020 | Nishida | B33Y 10/00 |
| 2021/0162656 A1* | 6/2021 | Beh | B29C 64/255 |
| 2022/0001612 A1 | 1/2022 | Zhao et al. | |
| 2022/0063194 A1 | 3/2022 | Abdul Jabbar et al. | |
| 2022/0258414 A1* | 8/2022 | Zguris | B33Y 70/00 |
| 2022/0305730 A1* | 9/2022 | Castanon Delgado | B29C 64/124 |
| 2023/0067468 A1 | 3/2023 | Sun et al. | |
| 2023/0078824 A1* | 3/2023 | Poelma | B29C 64/307 264/401 |
| 2023/0158736 A1* | 5/2023 | Zhao | B29C 64/124 264/401 |
| 2023/0158741 A1 | 5/2023 | Zhao et al. | |
| 2023/0158744 A1 | 5/2023 | Zhao et al. | |

FOREIGN PATENT DOCUMENTS

| | | | | |
|---|---|---|---|---|
| CN | 208558304 U | 3/2019 | | |
| JP | 2018535121 A | 11/2018 | | |
| KR | 101593488 B1 | 2/2016 | | |
| KR | 20190059099 A | 5/2019 | | |
| KR | 102060537 B1 | 12/2019 | | |
| WO | WO-9320993 A1 * | 10/1993 | | B29C 64/129 |
| WO | 2017010645 A1 | 1/2017 | | |
| WO | WO-2018169826 A1 * | 9/2018 | | B08B 3/10 |
| WO | WO-2023183310 A2 * | 9/2023 | | B01D 19/0042 |

\* cited by examiner

REPLENISHMENT SYSTEM FOR THREE-DIMENSIONAL PRINTING SYSTEM

BACKGROUND

Technical Field

The present disclosure generally relates to a replenishment system for a three-dimensional printing system. More specifically, the present disclosure relates to a replenishment system for a three-dimensional printing system in which a liquid polymer resin and an inert material are supplied to a tank of the three-dimensional printing system.

Background Information

Three-dimensional (3D) printing is the construction of a three-dimensional object from a digital file, such as a CAD model or a digital 3D model. The objects are printed layer by layer by the 3D printing system by curing portions of a light curable photopolymer resin layer by layer, one layer at a time, within a printing area of a tank filled with the photopolymer resin. A curing device, such as an ultraviolet light source, is projected through a transparent substrate or bottom wall of the tank curing each layer of the object on a carrier surface that is at least partially submerged within the photopolymer resin. The carrier surface is incrementally raised upward as each layer is cured thereon. One problem with such conventional arrangement is that portions of the photopolymer resin can adhere to the transparent substrate (bottom wall of the tank). This adhesion slows and/or delays the printing process, thereby decreasing productivity. It is therefore advantageous to prevent adhesion of the photopolymer to the transparent substrate.

In order to address this problem of adhesion, textured windows have been developed that include a textured surface in contact with the photopolymer resin. The textured surface includes grooves that are configured to hold a lubricant. The textured windows are substantially transparent and can be used as the transparent substrate. By providing a layer of the lubricant between the photopolymer resin and the transparent substrate, adhesion between the photopolymer and transparent substrate can be reduced.

Although these lubricant-infused textured windows can improve the printing speed by increasing the slip length along the textured window in the print area, the amount of lubricant along the surface of the textured window is depleted over time. Therefore, adhesion between the photopolymer and the transparent substrate can still become a problem when the amount of lubricant lost reaches a certain level. For example, a 20% loss in lubricant can render the textured window useless for printing due to adhesion problems. In addition, adhesion of the photopolymer to the transparent substrate can damage the textured window.

Therefore, further improvement is needed to reduce the adhesion of the photopolymer to the transparent substrate. In particular, it is desirable to compensate for the loss of lubricant on the surface of the textured window over time and to thereby extend the time for which the 3D printing system can continuously print.

SUMMARY

An object of the present disclosure is to provide a replenishment system for a three-dimensional printing system.

In view of the state of the known technology, one aspect of the present disclosure is to provide a 3D printing system. A tank contains a liquid photopolymer resin. A textured substrate is connected to the tank. The textured substrate is configured such that light passes therethrough into the liquid polymer resin. A layer of an inert material is disposed on the textured substrate. The liquid photopolymer resin and the inert material are discharged from the tank through a tank outlet. Additional liquid photopolymer resin and additional inert material are added to the tank through a tank inlet.

Also other objects, features, aspects and advantages of the disclosed replenishment system for a three-dimensional printing system will become apparent to those skilled in the art from the following detailed description, which, taken in conjunction with the annexed drawings, discloses exemplary embodiments of the replenishment system for a three-dimensional printing system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
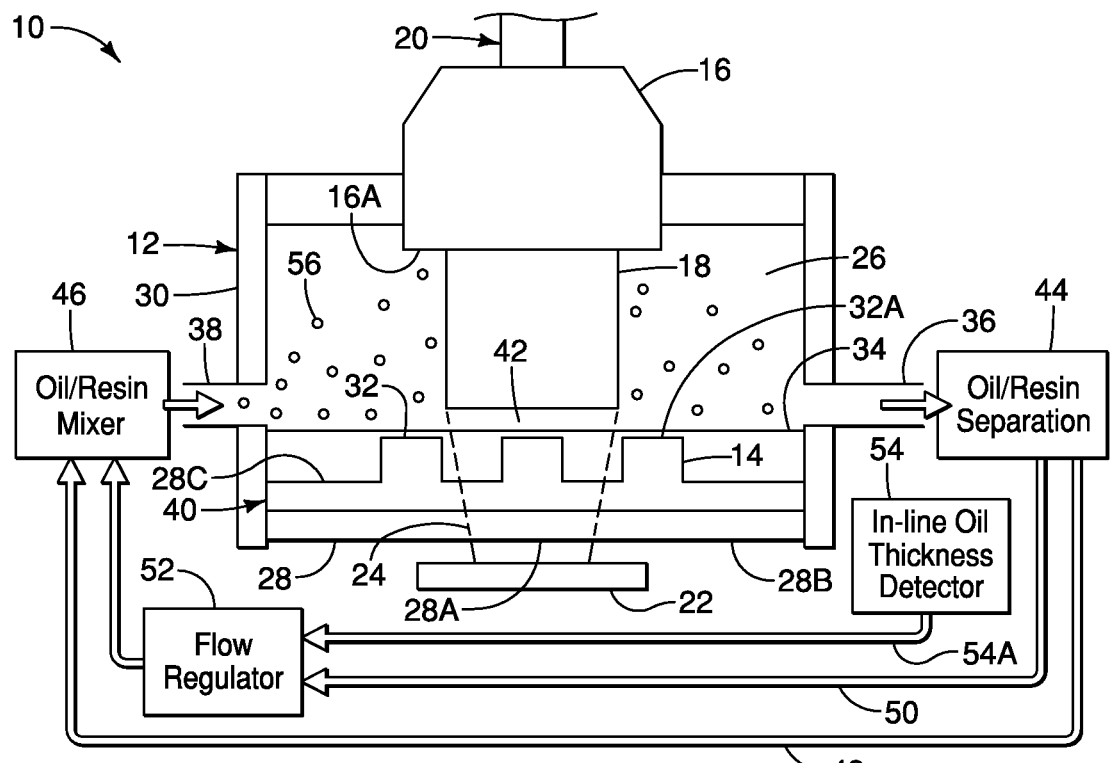
FIG. 1 is a side elevational view of a replenishment system for a 3D printing system in accordance with an exemplary embodiment in which a liquid polymer resin and an inert material are supplied to a tank of the 3D printing system.

Referring initially to FIG. 1, a 3D printing system 10 in accordance with an exemplary embodiment includes a tank 12, and a textured substrate 14 connected to the tank 12. The 3D printing system 10 further includes a rigid base 16 on which an object 18 is to be printed and a control arm 20 connected to the rigid base 16.

The rigid base 16 has a print surface 16A on which the object 18 is configured to be printed, as shown in FIG. 1. The control arm 20 is connected to the rigid base 16 to move the rigid base 16 relative to the tank 12. A light source 22 is configured to emit light 24 to the tank 12 to form the printed object 18 on the rigid base 16.

The tank 12 contains a liquid photopolymer resin 26, as shown in FIG. 1. The tank 12 can be any suitable shape to hold the liquid polymer resin 26 therein, such as rectangular or circular. The tank 12 has a base 28 and a side wall 30 extending upwardly from the base 28. The base 28 is preferably transparent such that the light 24 emitted from the light source 22 can pass through the base 28. The entirety of the base 28 can be transparent, or a portion of the base 28 can be transparent. The transparent portion of the base 28 constitutes an optically transparent window 28A through which the emitted light 24 can pass.

The rigid base, or build platform, build plate or print bed, 16 provides the surface 16A on which the object 18 is printed. The print surface 16A is preferably a planar surface, as shown in FIG. 1. The rigid base 16 can be made of any suitable material, such as plastic, such as polyactic acid (PLA), or glass.

The control arm 20 is connected to the rigid base 16 to control movement and positioning of the rigid base 16 during the printing process. The control arm 20 is connected to the rigid base 16 to move the rigid base 16 relative to the tank 12. The control arm 20 preferably has six degrees of freedom, such that the rigid base 16 can move through a curvilinear path to more accurately print the object 18. The control arm 20 is preferably a robotic arm having six degrees of freedom. The six degrees of freedom are movements along the three axes (i.e., the X, Y and Z axes), and rotation about each of the three axes (i.e., pitch, roll and yaw). Providing the control arm 20 with multiple degrees of freedom, such as six degrees of freedom, allows the control arm 20 to move the rigid base 16 through a curvilinear path, including moving the rigid base 16 to a plurality of positions, thereby allowing a more accurate object 18 to be printed.

The liquid polymer resin 26 is selectively cured by light-activated polymerization, such as by photopolymerization, which preferably uses visible or UV light, although light having any suitable wavelength can be used, to form in situ cross-linked polymer structures. The liquid polymer resin 26 preferably includes monomer and oligomer molecules that are converted to solid polymers during photopolymerization when the light 24 emitted by the light source 22 is guided through the transparent portion, or the optically transparent window 28A, of the base 28 of the tank 12.

The light source 22 emits light 24 to cure the liquid polymer resin 26 in the tank 12, as shown in FIG. 1. The light source 21 preferably emits UV light 24 having a wavelength between approximately 10 and 400 nanometers, inclusive. Preferably, the emitted UV light 24 has a wavelength between approximately 380 and 400 nanometers, inclusive. Light having any suitable wavelength can be used, such as, but not limited to, UV, visible and infrared light.

As shown in FIG. 1, the textured substrate 14 is connected to the tank 12. The textured substrate 14 is preferably at least disposed on the optically transparent window 28A of the base 28. The textured substrate 14 is configured such that the light 24 emitted by the light source 22 passes through the textured substrate 14 to the liquid polymer resin 26 in the tank 12. The base 28 has an outer surface 28B that faces the light source 22 and an inner surface 28C that faces the liquid polymer resin 26 and the print surface 16A of the rigid base 16. The textured substrate 14 faces the liquid polymer resin 26.

The textured substrate 14 is preferably formed integrally with the base 28 of the tank 12 to define a textured window 40. In other words, the textured substrate 14 is the surface of the optically transparent window facing the liquid polymer resin 26. Alternatively, the textured substrate 14 can be an insert disposed on the base 28 of the tank 12.

The textured substrate 14 includes a plurality of protrusions 32 extending upwardly from the inner surface 28C of the base 28. In other words, the textured substrate 14 includes a textured surface facing the liquid polymer resin 26. The textured surface includes the plurality of protrusions 32. The plurality of protrusions preferably form a plurality of rows extending in a length direction of the base 28, and a plurality of columns extending in the width direction of the base 28, although the protrusions can be arranged in any suitable configuration. Each protrusion 32 is preferably equally spaced from adjacent protrusions 32 in the row by a predetermined distance. Each protrusion 32 is preferably equally spaced from adjacent protrusions 32 in the column by a predetermined distance. Preferably, the predetermined distances for the rows and columns of the protrusions 32 are substantially equal. Preferably, the projections 32 measure a few microns or sub-microns in the x, y and z directions. For example, the textured substrate 14 can include projections 32 measuring 10×10×10 microns.

The protrusions 32 can have any suitable shaped, such as being substantially rectangular. The protrusions 32 increase the surface area of the inner surface 28C of the base 28 to increase heat dissipation of the heat generated during light radiation and resin polymerization. In other words, the protrusions 32 act like a heat sink to facilitate heat dissipation. Heat generated during the light radiation and resin polymerization during a printing process is dissipated from tank 12 through the textured substrate 14.

A layer of an inert liquid 34 is disposed on the textured substrate 14, as shown in FIG. 1. The inert liquid 34 facilitates preventing adhesion between the liquid polymer resin 26 and the textured substrate 14. The inert liquid 34 is preferably disposed above upper surfaces 32A of the projections 32 of the textured substrate 14. A refractive index of the inert liquid 34 is approximately equal to a refractive index of the textured substrate 14. Substantially matching the refractive indices of the inert liquid 34 and the textured substrate 14 minimizes diffraction of the light 24 emitted by the light source 22 to facilitate maintaining printing resolution. The inert liquid 34 is preferably immiscible and non-reactive with the liquid polymer resin 26. Preferably, the inert liquid 34 has a higher density than the liquid polymer resin 26 to facilitate the inert liquid 34 being disposed between the textured substrate 14 and the liquid polymer resin 26. The inert liquid 34 can be any suitable liquid, such as perfluoropolyether copolymers, fluorosilicone polymers, perfluorocarbon liquid, allicin or garlic oils, Chemours Krytox GPL oil, and Solvay Fomblin Y oil. The inert liquid 34 preferably has a thickness of approximately 3 nm to approximately 5 nm, although the inert liquid 34 can have any suitable thickness.

The emitted light 24 passing through the layer of the inert liquid 34 exhibits minimal attenuation, such that the transmitted power of the emitted light is substantially not reduced. The resulting 3D printing process is energy efficient such that high-speed fabrication of parts is possible with the 3D printing process in accordance with the exemplary embodiments. Existing methods to prevent resin adhesion during the printing process, such as forming a resin dead zone between the transparent window and the printed part, results in problematic light attenuation, which reduces the transmitted power of the emitted light and greatly reduces the obtainable printing speed of the existing 3D printing systems.

The textured window 40 is optically transparent and has an ultraviolet light transmittance of at least 60%, preferably at least 90%, such that focused beams of light 24 emitted from the light source 22 pass therethrough and at predetermined areas or portions of the polymerizable resin located within a printing area 42. The printing area 42 is defined as the space below the rigid base 16 (at and/or below a lower surface of the object 18 being printed) and the upper surface of the inert liquid 34. The printing area 42 is preferably located above and spaced apart from the textured window 40 of the tank 12 but can be in contact with the textured window 40 if the inert liquid 34 is depleted during operation.

As shown in FIG. 1, the tank 12 includes a tank outlet 36 and a tank inlet 38. The tank outlet 36 is configured to discharge the liquid photopolymer resin 26 and the inert material 34 from the tank 12. The tank inlet 38 is configured to add additional liquid photopolymer resin and additional inert material to the tank 12. The tank outlet 36 and the tank inlet 38 are disposed above an upper surface of the inert material 34.

A separator 44 is fluidly connected to the tank outlet 36, as shown in FIG. 1. The separator 44 is configured to separate the liquid photopolymer resin and the inert material discharged from the tank 12. The separator 44 can be any suitable device configured to separate the discharged liquid photopolymer resin from the discharged inert material, such as, but not limited to, a centrifuge, a filter, and a tank configured to separate the discharged liquid photopolymer resin from the discharged inert material based on the different densities of the discharged liquid photopolymer resin from the discharged inert material.

A mixer 46 is fluidly connected to the tank inlet 38, as shown in FIG. 1. The mixer 46 is configured to supply liquid photopolymer resin and inert material to the tank 12. The mixer 46 is configured to supply the liquid photopolymer resin and the inert material together to the tank inlet 38. The mixer 46 can be any suitable device configured to generate droplets 56 of the inert material in the liquid photopolymer resin, such as, but not limited to, an ultrasonic mixer, a piezoelectric dropper, and a microfluidic device.

A liquid photopolymer resin pipe 48 connects the separator 44 to the mixer 46, as shown in FIG. 1. The liquid photopolymer resin pipe 48 is configured to supply the separated liquid photopolymer resin from the separator 44 to the mixer 46.

An inert material pipe 50 connects the separator 44 to the mixer 46, as shown in FIG. 1. The inert material pipe 50 is configured to supply the separated inert material from the separator 44 to the mixer 46.

A flow regulator 52 is fluidly connected to the inert material pipe 50, as shown in FIG. 1. The flow regulator 52 is preferably disposed between the separator 44 and the mixer 46. The flow regulator 52 is configured to regulate the supply of the separated inert material from the separator 44 to the mixer 46. The supply of the separated inert material can be based on any suitable parameter, such as a thickness of the inert material 34 in the tank 12. The flow regulator 52 can be any suitable device configured to control an amount of separated inert material supplied to the mixer 46, such as, but not limited to, a flow control valve. The flow regulator 52 includes a controller to control the amount of the separated inert material supplied to the mixer 46.

A sensor 54 is configured to detect a thickness of the inert material 34 in the tank 12, as shown in FIG. 1. The sensor 54 is disposed in any suitable location based on the method of determining the thickness of the inert material 34 in the tank 12. The sensor 54 can detect the thickness of the inert material 34 in the tank 12 in any suitable manner, such as optically or electronically. For example, the sensor 54 can be configured to determine a thickness of the inert material 34 in the tank 12, such as by an adhesion force measurement from a load cell (not shown) connected to the rigid base 16 or by confocal imaging.

The sensor 54 determines a thickness of the inert material 34 in the tank 12 to control an amount of inert material to be supplied to the mixer 46. The sensor 54 is electrically connected by an electrical wire 54A to the flow regulator 52 to control the supply of inert material from the separator 44 to the mixer 46 based on the detected thickness of the inert material 34 in the tank 12. The sensor 54 transmits a control signal through the electrical wire 54A to the flow regulator 52 to control an amount of the separated inert material supplied from the flow regulator 52 to the mixer 46. When the detected thickness of the inert material in the tank 12 is greater than or equal to a predetermined thickness, less inert material is supplied to the mixer 46. When the detected thickness of the inert material 34 is less than or equal to the predetermined thickness, more inert material is supplied to the mixer 46.

Droplets 56 of inert material are suspended in the liquid photopolymer resin supplied from the mixer 46 through the tank inlet 38 to the tank 12 to replenish the depleted inert material 34 in the tank 12. The supplied droplets 56 of the inert material are transported to the printing area 42 and impinge on the inert material 34. Forces generated during printing deplete the inert material 34 in the printing area 42 first, and thus draw the supplied droplets 56 to the printing area 42. The liquid photopolymer resin and the inert material can be replenished during printing or following completion of printing. Pumps (not shown) can be disposed in the liquid photopolymer resin pipe 48 and the inert material pipe 50 to facilitate drawing liquid photopolymer resin and inert material out of the tank and to supply the separated liquid photopolymer resin and inert material through the liquid photopolymer resin pipe 48 and the inert material pipe 50 and into the tank 12.

Figure 2:
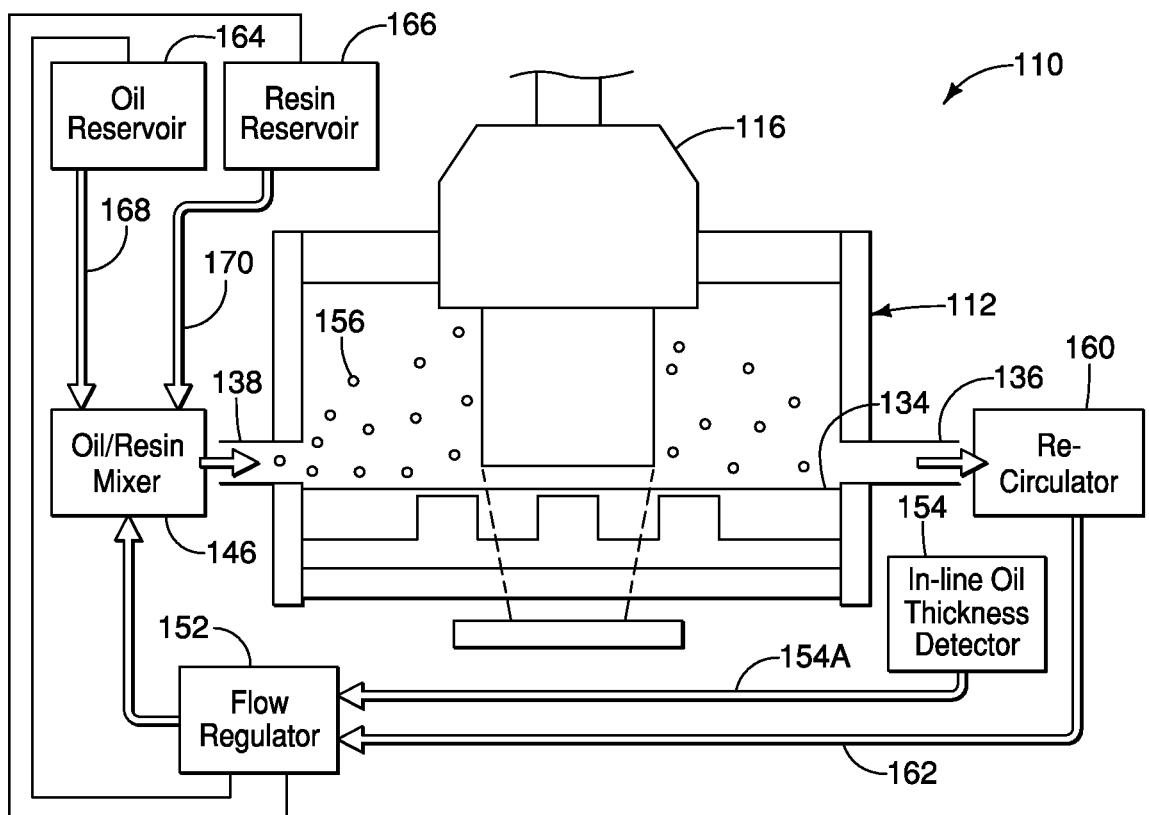
FIG. 2 is a side elevational view of a replenishment system for a 3D printing system in accordance with another exemplary embodiment.
Figure 3:
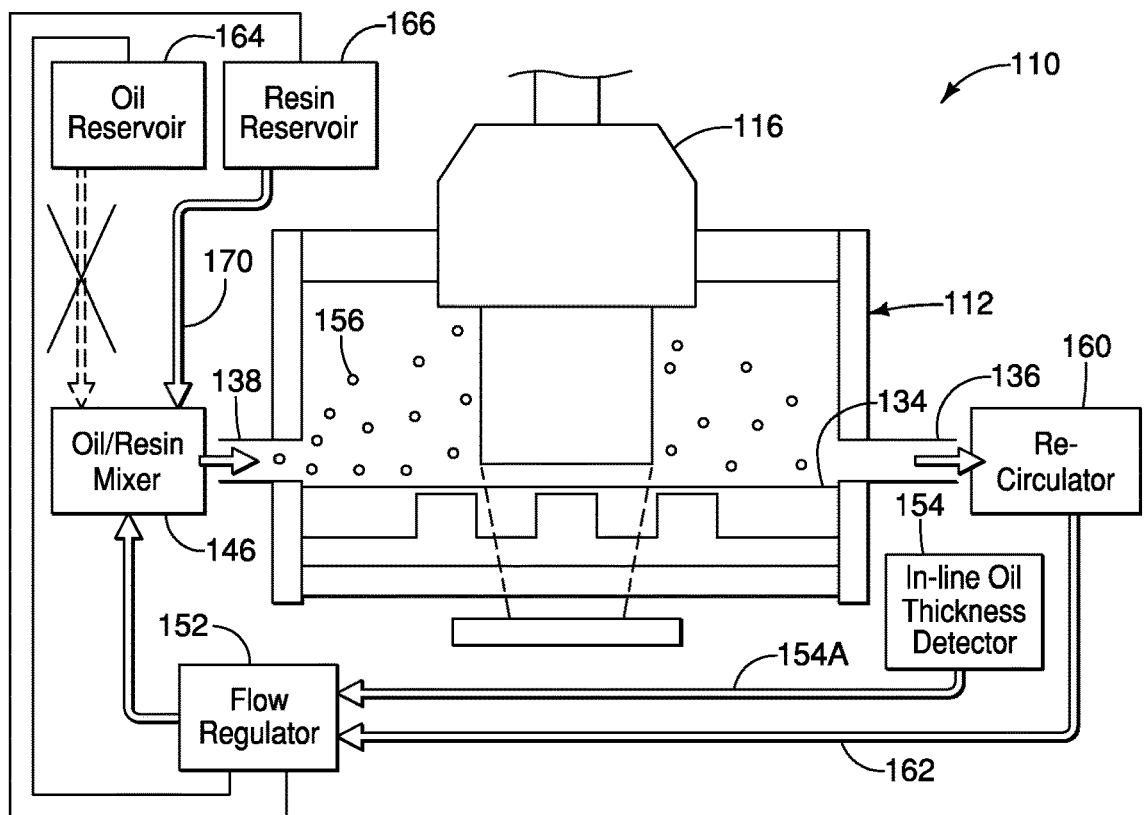
FIG. 3 is a side elevational view of the replenishment system of FIG. 2 in which fresh inert material is supplied to a tank of the 3D printing system.
Figure 4:
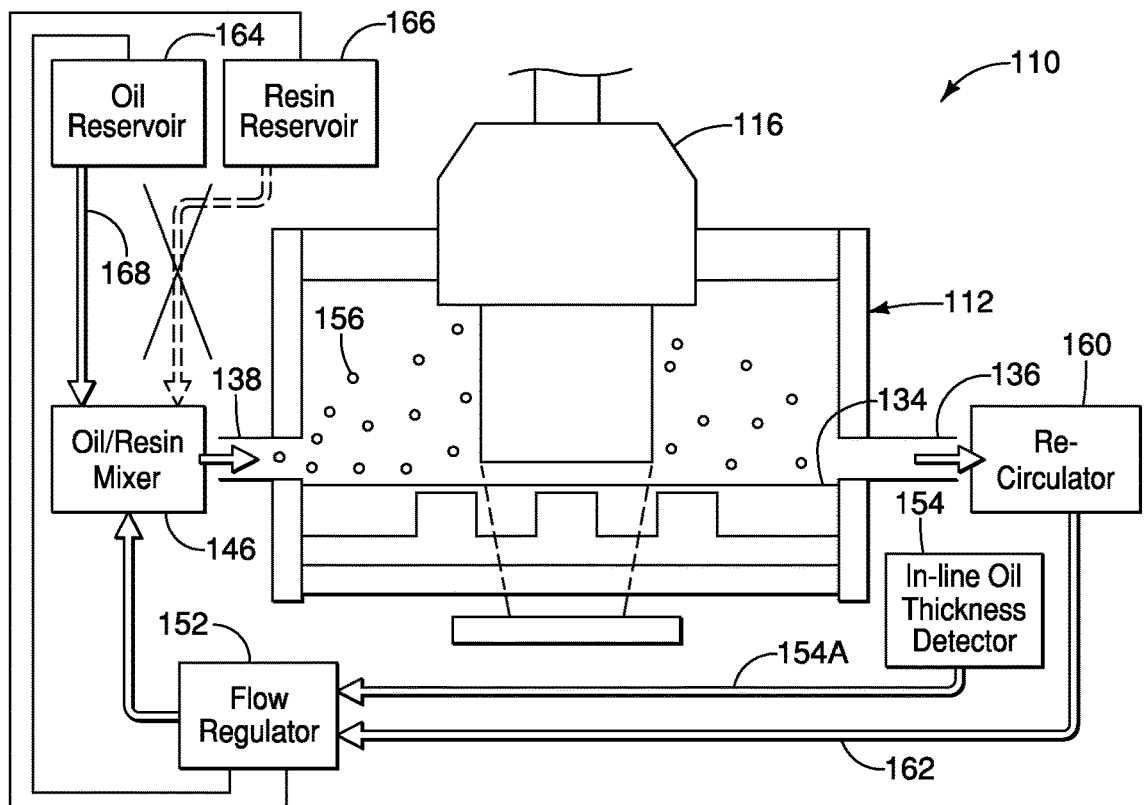
FIG. 4 is a side elevational view of the replenishment system of FIG. 2 in which fresh liquid photopolymer resin is supplied to a tank of the 3D printing system.

As shown in FIGS. 2-4, a 3D printing system 110 in accordance with another illustrated exemplary embodiment of the present invention is substantially similar to the 3D printing system 10 of the exemplary embodiment illustrated in FIG. 1 except for the differences described below. Similar parts are identified with similar reference numerals, except increased by 100 (i.e., 1xx, accordingly).

As shown in FIGS. 2-4, the 3D printing system 110 includes a recirculator 160 fluidly connected to the tank outlet 136, a first reservoir 164 fluidly connected to the mixer 146, and a second reservoir 166 fluidly connected to the mixer 146.

The recirculator 160 is configured to supply recirculated liquid photopolymer resin and recirculated inert material discharged from the tank 112 to the mixer 146 through a recirculation pipe 162. The recirculation pipe 162 supplies the recirculated liquid photopolymer resin and the recirculated inert material together from the recirculator 160 to the mixer 146. The recirculator 160 can include a pump to facilitate supplying the recirculated liquid photopolymer resin and recirculated inert material to the flow regulator 152 through the recirculation pipe 152.

The flow regulator 152 is connected to the recirculation pipe 162, as shown in FIGS. 2-4. The flow regulator 152 controls the flow of the recirculated liquid photopolymer resin and inert material through the recirculation pipe 162 to the mixer 146 based on a control signal transmitted by the sensor 154. The flow regulator 152 can be any suitable device configured to control an amount of recirculated inert material supplied to the mixer 146, such as, but not limited to, a flow control valve. The sensor 154 is electrically connected to the flow regulator 152 by an electrical wire 154A. The flow regulator 152 includes a controller to control the amount of recirculated inert material supplied to the mixer 146.

The flow regulator 152 controls the supply of the recirculated liquid photopolymer resin and inert material based on either a detection of the inert material 134 in the tank 112 or a detection of the recirculated inert material in the recirculation pipe 162. The sensor 154 is disposed based on the method of detecting the inert material. The sensor 154 is suitably disposed to detect the inert material in the tank 112 or suitably connected to the recirculation pipe 162 to detect the recirculated inert material therein.

The sensor 154 can be configured to detect the thickness of the inert material 134 in the tank 112 in any suitable manner, such as optically or electronically. For example, the sensor 154 can be configured to determine a thickness of the inert material 134 in the tank 112, such as by an adhesion force measurement from a load cell (not shown) connected to the rigid base 116 or by confocal imaging. Alternatively, the sensor 154 can be configured to determine the recirculated inert material in the recirculation pipe 162 between the recirculator 160 and the flow regulator 152. The sensor 152 can detect the recirculated inert material in the recirculation pipe 162 by any suitable method including, but not limited to, detected a concentration of the inert material in the recirculation pipe 162, confocal imaging, and optical coherence tomography. The flow regulator 152 regulates the supply of the recirculated inert material supplied to the mixer 146 from the flow regulator 152 based on the inert material detected by the sensor 154.

A first reservoir 164 is fluidly connected to the mixer 146, as shown in FIGS. 2-4. The first reservoir stores fresh inert material to be supplied to the mixer 146 through a fresh inert material pipe 168. The first reservoir is electrically connected to the flow regulator 152 to control the amount of fresh inert material supplied to the mixer 146 based on a sensed condition detected by the sensor 154.

A second reservoir 166 is fluidly connected to the mixer 146, as shown in FIGS. 2-4. The second reservoir stores fresh liquid photopolymer resin to be supplied to the mixer 146 through a fresh liquid photopolymer resin pipe 170. The second reservoir 166 is electrically connected to the flow regulator 152 to control the amount of fresh liquid photopolymer resin supplied to the mixer 146 based on a sensed condition detected by the sensor 154.

The recirculated liquid photopolymer resin and inert material supplied to the tank 112 through the tank inlet 138 from the mixer 146 can be supplemented by fresh inert material from the first reservoir 164 or fresh liquid photopolymer resin from the second reservoir 166.

As shown in FIG. 3, when inert material detected by the sensor 154 is greater than a predetermined amount, then the amount of inert material 134 in the tank 112 is sufficient. Shear forces in the tank 112 during the printing process dislodge inert material 134, and the dislodged inert material is discharged from the tank 112 through the tank outlet 136, which indicates that an acceptable amount of inert material 134 is present in the tank 112. A signal is sent to the second reservoir 166 from the flow regulator 152 to add fresh liquid photopolymer resin to the mixer 146 to lower the percentage of recirculated resin to be supplied to the tank 112. Fresh liquid photopolymer resin is added to the recirculated resin in the mixer 146 such that the percentage of the inert material relative to the combined recirculated and fresh liquid photopolymer resin is lessened. The controller of the flow regulator 156 determines a concentration of liquid photopolymer resin to be added to the tank 112 through the inlet 138 based on the sensor 154 detection, and controls the flow regulator 156, the first reservoir 164 and the second reservoir 166 to supply a mixture of the liquid photopolymer resin and the inert material having the determined concentration of liquid photopolymer resin.

As shown in FIG. 4, when an amount of inert material detected by the sensor 154 is less than a predetermined amount, then the amount of inert material 134 in the tank 112 is insufficient. An amount of inert material in the recirculation pipe 162 indicates a depleted state of the inert material 134 present in the tank 112. A signal is sent to the first reservoir 164 to add fresh inert material to the mixer 146 to increase the percentage of inert material to be supplied to the tank 112. Fresh inert material is added to the recirculated inert material in the mixer 146 such that the percentage of the recirculated and fresh inert material relative to the recirculated liquid photopolymer resin is increased. The controller of the flow regulator 156 determines a concentration of inert material to be added to the tank 112 through the inlet 138 based on the sensor 154 detection, and controls the flow regulator 156, the first reservoir 164 and the second reservoir 166 to supply a mixture of the liquid photopolymer resin and the inert material having the determined concentration of inert material.

Droplets of inert material 156, including recirculated and fresh inert material, suspended in liquid photopolymer resin, including recirculated liquid photopolymer resin and fresh liquid photopolymer resin, is added to the tank 112 through the tank inlet 138 from the mixer 146 to replace depleted inert material in the tank 112.

As shown in FIGS. 5-8, a 3D printing system 210 in accordance with another illustrated exemplary embodiment of the present invention is substantially similar to the 3D printing systems 10 and 110 of the exemplary embodiments illustrated in FIGS. 1-4 except for the differences described below. Similar parts are identified with similar reference numerals, except increased by 200 or 100 (i.e., 2xx, accordingly), as appropriate.

As shown in FIGS. 5-8, the 3D printing system 110 is substantially similar to the 3D printing system of FIGS. 2-4 with the addition of a second fresh inert material pipe 272 supplying fresh inert material from the first reservoir 264 directly to the tank 212.

The 3D printing system 210 includes the recirculator 260, the sensor 254, the flow regulator 252, the mixer 246, the first reservoir 264 and the second reservoir 266, which operate substantially similarly as described above with reference to FIGS. 2-4. Recirculated liquid photopolymer resin and inert material is discharged from the tank 212 through the tank outlet 236 to the recirculatory 260 and supplied to the mixer 246. Fresh inert material and fresh liquid photopolymer resin is supplied through the first fresh inert material pipe 268 and the fresh liquid photopolymer resin pipe 270 to the mixer 246 as described above with reference to FIGS. 2-4. Droplets of inert material 256, including recirculated and fresh inert material, suspended in liquid photopolymer resin, including recirculated liquid photopolymer resin and fresh liquid photopolymer resin, is added to the tank 212 through the tank inlet 238 from the mixer 246 to replace depleted inert material in the tank 212, as described above with reference to FIGS. 2-4.

Figure 5:
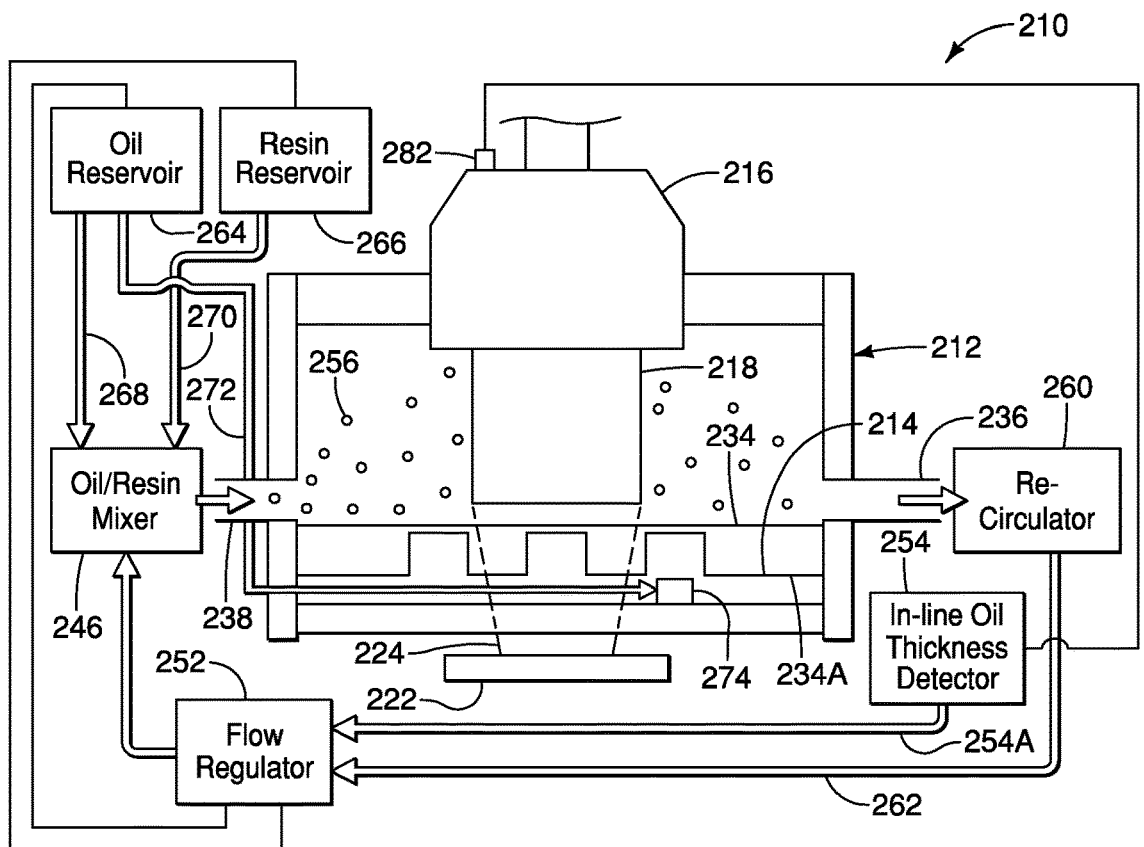
FIG. 5 is a side elevational view of a replenishment system for a 3D printing system in accordance with another exemplary embodiment.

As shown in FIG. 5, the second fresh inert material pipe 272 supplies fresh inert material directly from the first reservoir 264 to the tank 212. The textured substrate 214 is made of a porous material, such as a porous polydimethylsiloxane (PDMS), including a plurality of internal channels 274. The second fresh inert material pipe 272 directly supplies fresh inert material to the plurality of internal channels 274. The plurality of internal channels 274 are in fluid communication with the inert material 214 in the tank 212. Fresh inert material from the first reservoir 264 is supplied through the second fresh inert material pipe 272 and through the plurality of internal channels 274 to replenish the inert material 234 in the tank 212. The second fresh inert material pipe 272 is connected to the tank 212 below a lower level 234A of the inert material 234 in the tank 212. The fresh inert material supplied through the second fresh inert material pipe 272 passes through the textured substrate 214 to the inert material 234 in the tank 212.

Figure 6:
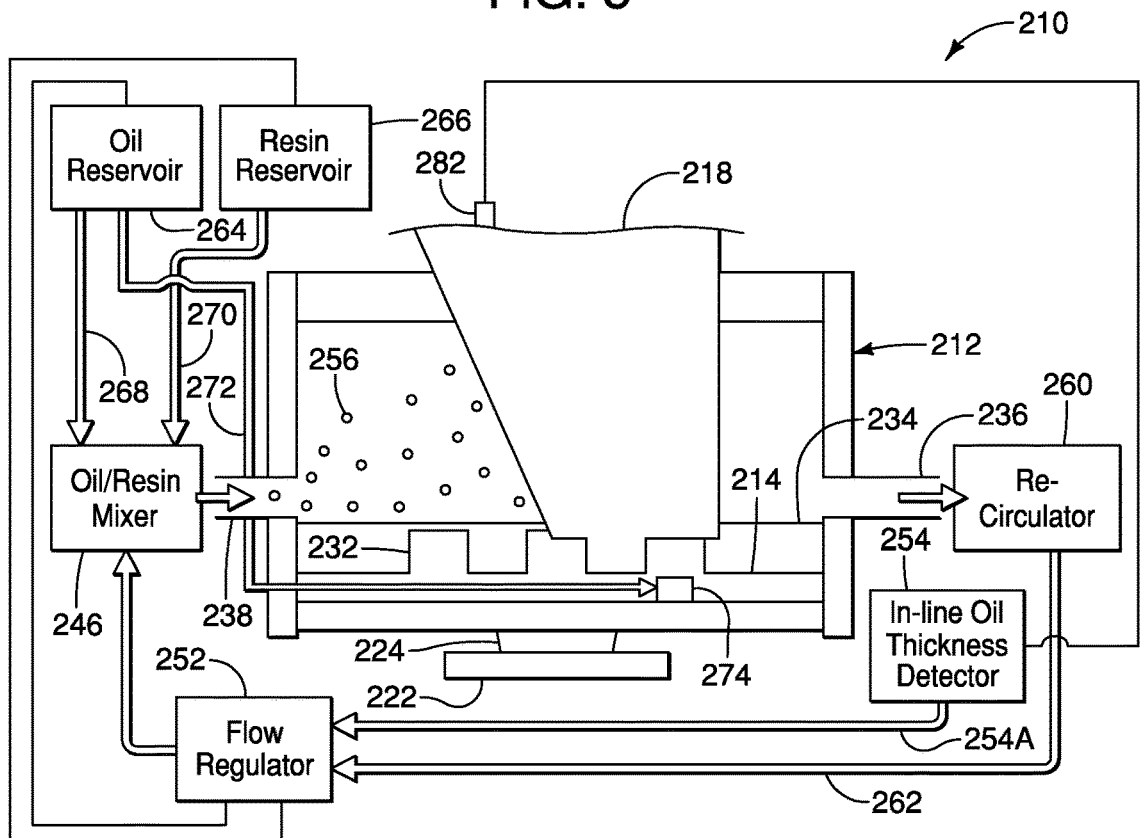
FIG. 6 is a side elevational view of the replenishment system of FIG. 5 in which a printed part is stuck to a surface.

During a printing process, the light source 222 emits light 224 to the tank 212 to form the printed object 218 on the rigid base 216. As shown in FIG. 6, the printed object 218 can become adhered to the textured substrate 214 during the printing process. The projections 232 of the textured substrate can be damaged by removal of the printed object 218. The sensor 254 can be configured to detect an adhesion force measurement of the rigid base 216 from a load cell 282 connected to the rigid base 216. Alternatively, any suitable sensor can be used to measure an adhesion force of the rigid base, and to transmit a signal to the sensor 254. When the detected adhesion force is greater than a predetermined value, the printed object 218 is determined to be adhered to the textured substrate 214.

Figure 7:
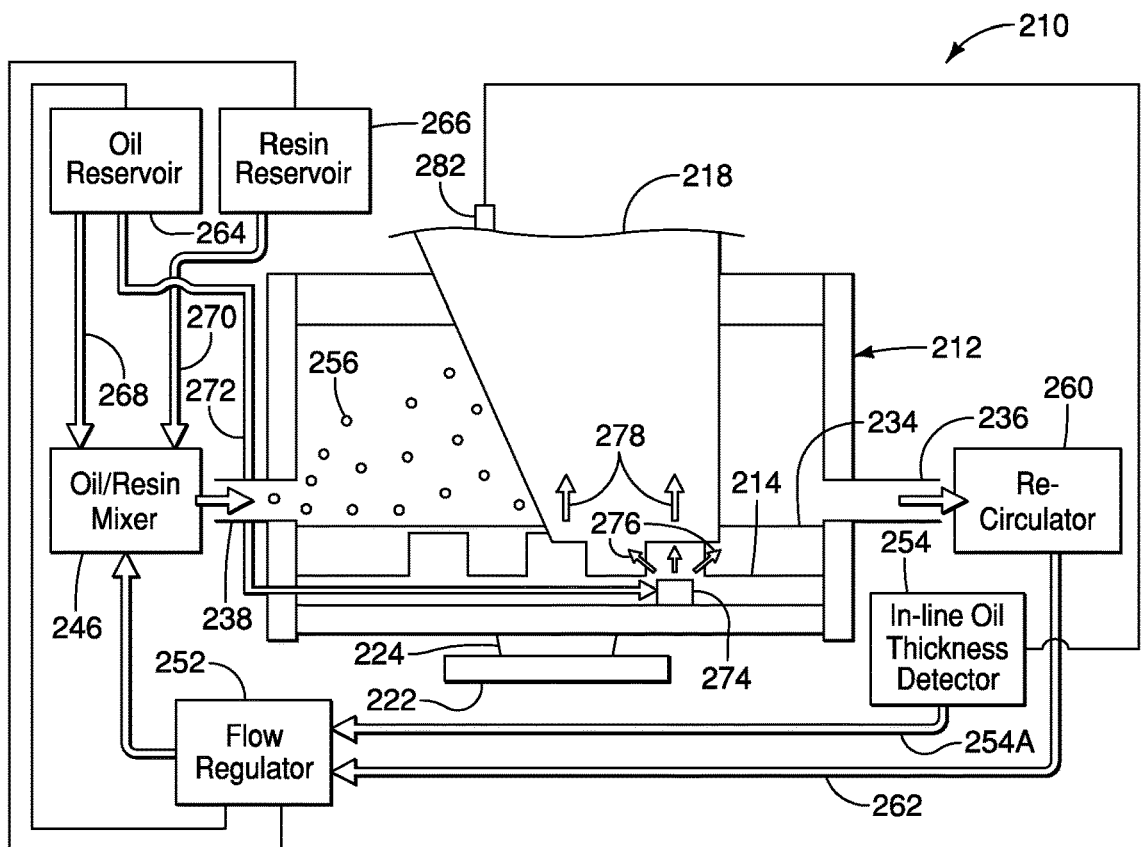
FIG. 7 is a side elevational view of the replenishment system of FIG. 6 in which fresh inert material is supplied to a tank of the 3D printing system.
Figure 8:
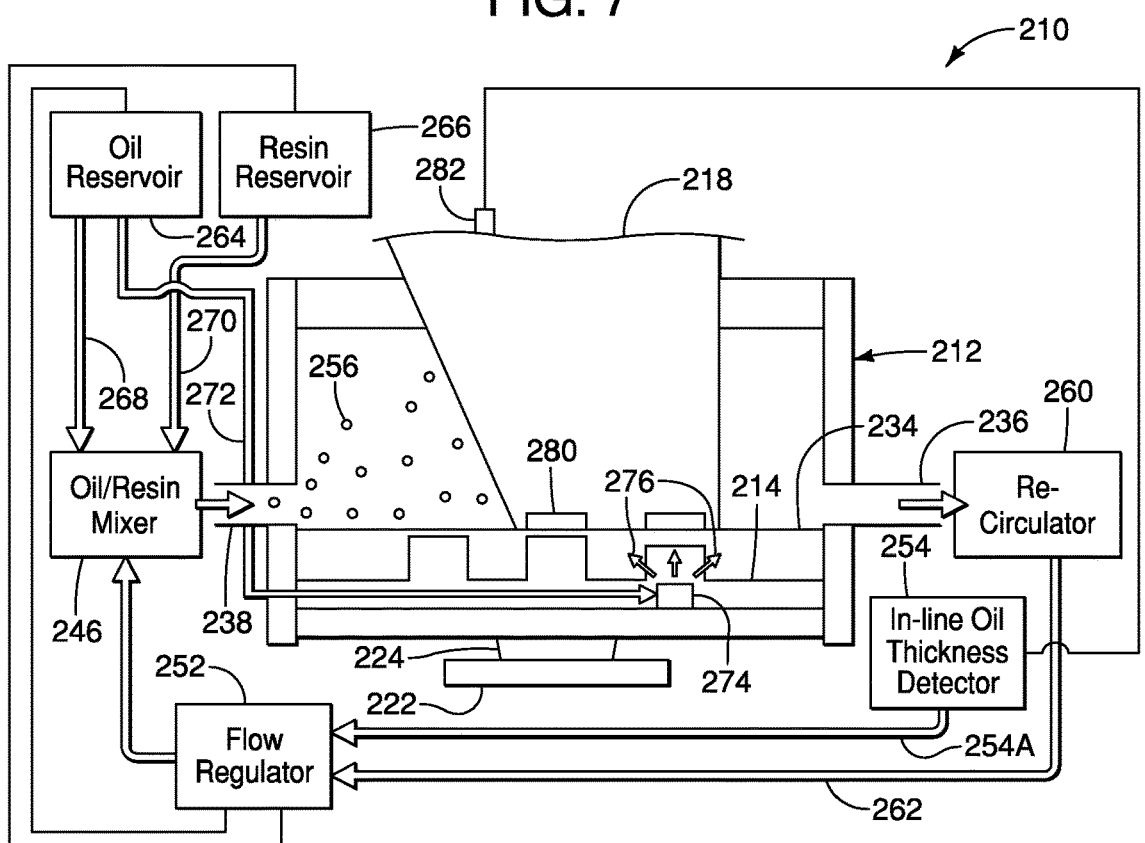
FIG. 8 is a side elevational view of the replenishment system of FIG. 7 in which the stuck printed part is separated from the surface.

When the sensor 254 determines that the printed object is stuck to the textured substrate 214, a signal is transmitted to the first reservoir 264 through the controller of the flow regulator 252. The first reservoir 234 supplies fresh inert material through the second fresh inert material pipe 272 to the plurality of channels 274 disposed in the textured substrate 214, as shown in FIG. 7. The fresh inert material is supplied from the plurality of internal channels 274 to the inert material 234, as indicated by arrows 276. The supplied fresh inert material exerts a force, as indicated by arrows 278, on the adhered printed object 218. The force applied to the printed object dislodges the printed object 218 from the textured substrate 214, as shown in FIG. 8. The dislodged printed object 218 includes recesses 280 corresponding to the projections 232 of the textured substrate 214 to which the printed object 218 was adhered. The locally supplied fresh inert material dislodges the printed object 218 from the textured substrate 214 without damaging the textured substrate.

When a more immediate supply of fresh inert material is to be supplied to the tank 212, the controller of the flow regulator 252 transmits a signal to the first reservoir 264 to supply fresh inert material through the second fresh inert material pipe 272 to the plurality of channels 274 and through the textured substrate 214. The fresh inert material supplied in this manner is more quickly added to the inert material 234 in the tank 212.

General Interpretation of Terms

The controllers preferably include a microcomputer with a control program that controls various operations as discussed above. The controllers can also include other conventional components, such as an input interface circuit, an output interface circuit, and storage devices, such as a ROM (Read Only Memory) device and a RAM (Random Access Memory) device. The microcomputers of the controllers are programmed to control the various operations discussed above. The memory circuit stores processing results and control programs, such as ones for operations that are run by the processor circuits. The internal RAM of the controllers stores statuses of operational flags and various control data. The internal ROM of the controllers store the information for various operations. The controllers are capable of selectively controlling any of the components of the control system in accordance with the control program.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle seat movement prevention system and method. Accordingly, these terms, as utilized to describe the present invention should be interpreted relative to a vehicle equipped with the vehicle seat movement prevention system and method.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A 3D printing system comprising:
   a tank containing a liquid photopolymer resin;
   a substrate connected to the tank and through which light is configured to pass into the liquid polymer resin;
   a layer of an inert material disposed on the substrate;
   a tank outlet through which the liquid photopolymer resin and the inert material are discharged from the tank;
   a tank inlet through which additional liquid photopolymer resin and additional inert material are added to the tank; and
   a mixer fluidly connected to the tank inlet, the mixer being configured to supply the liquid photopolymer resin and the inert material to the tank.

2. The 3D printing system according to claim 1, wherein the tank includes an optically transparent window through which the light is configured to pass.

3. The 3D printing system according to claim 2, wherein the substrate includes a plurality of protrusions extending upwardly from a surface of the substrate facing the liquid photopolymer resin.

4. The 3D printing system according to claim 1, wherein a separator is fluidly connected to the tank outlet, the separator being configured to separate the liquid photopolymer resin and the inert material.

5. The 3D printing system according to claim 4, wherein a liquid photopolymer resin pipe connects the separator to the mixer, the liquid photopolymer resin pipe being configured to supply the separated liquid photopolymer resin from the separator to the mixer.

6. The 3D printing system according to claim 5, wherein an inert material pipe connects the separator to the mixer, the inert material pipe being configured to supply the separated inert material from the separator to the mixer.

7. The 3D printing system according to claim 6, wherein a sensor is configured to detect a thickness of the inert material in the tank.

8. The 3D printing system according to claim 7, wherein a flow regulator regulates the supply of the separated inert material from the separator to the mixer based on the thickness of the inert material detected by the sensor.

9. The 3D printing system according to claim 8, wherein the tank inlet and the tank outlet are disposed above an upper surface of the inert material.

10. A 3D printing system comprising:
    a tank containing a liquid photopolymer resin;
    a substrate connected to the tank and through which light is configured to pass into the liquid polymer resin;
    a layer of an inert material disposed on the substrate;
    a tank outlet through which the liquid photopolymer resin and the inert material are discharged from the tank;
    a tank inlet through which additional liquid photopolymer resin and additional inert material are added to the tank;
    a mixer fluidly connected to the tank inlet, the mixer being configured to supply the liquid photopolymer resin and the inert material to the tank; and
    a recirculator fluidly connected to the tank outlet, the recirculator being configured to supply recirculated liquid photopolymer resin and recirculated inert material discharged from the tank to the mixer.

11. The 3D printing system according to claim 10, wherein
    a first reservoir is fluidly connected to the mixer, the first reservoir being configured to supply fresh inert material to the mixer; and
    a second reservoir is fluidly connected to the mixer, the second reservoir being configured to supply fresh liquid photopolymer resin to the mixer.

12. The 3D printing system according to claim 11, wherein
    a sensor is configured to detect the recirculated inert material in a recirculation pipe from the recirculator to the mixer.

13. The 3D printing system according to claim 12, wherein
    a flow regulator regulates the supply of the recirculated inert material from the separator to the mixer based on the recirculated inert material detected in the recirculation pipe by the sensor.

14. The 3D printing system according to claim 13, wherein
    the supply of the fresh inert material from the first reservoir to the mixer is based on the recirculated inert material detected in the recirculation pipe by the sensor.

15. The 3D printing system according to claim 14, wherein
    the supply of the fresh liquid photopolymer resin from the second reservoir to the mixer is based on the amount of the recirculated inert material detected in the recirculation pipe by the sensor.

16. The 3D printing system according to claim 15, wherein
    the tank inlet and the tank outlet are disposed above an upper surface of the inert material layer.

17. The 3D printing system according to claim 11, wherein
    a supply pipe fluidly connects the first reservoir to the tank to supply the fresh inert material to the tank.

18. The 3D printing system according to claim 17, wherein
    the supply pipe is connected to the tank below a lower level of the inert material in the tank.

19. The 3D printing system according to claim 18, wherein
    the substrate is made of a porous material, the fresh inert material supplied through the supply pipe being configured to pass through the substrate to the inert material.

20. The 3D printing system according to claim 13, wherein
    the substrate includes a plurality of protrusions extending upwardly from a surface of the substrate facing the liquid photopolymer resin.

* * * * *